Figure 1:
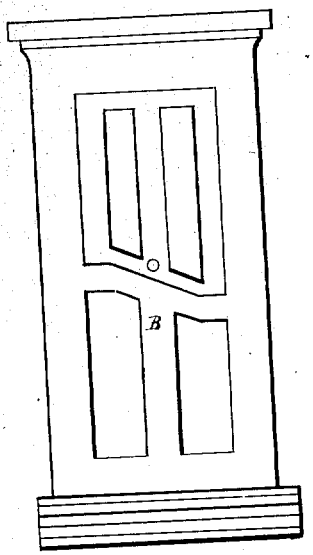

J. W. MOLIERE.

ELECTRO THERAPEUTIC BATH.

Reissued Dec. 5, 1876.

No. 7,415.

Witnesses.
J. H. Burridge.
R. L. Mason

Inventor.
J. W. Moliere M. D.
Per Burridge & Co.
Attys.

UNITED STATES PATENT OFFICE.

JAMES W. MOLIÈRE, OF CLEVELAND, OHIO.

IMPROVEMENT IN ELECTRO-THERAPEUTIC BATHS.

Specification forming part of Letters Patent No. 162,091, dated April 13, 1875; reissue No. 7,415, dated December 5, 1876; application filed November 9, 1876.

*To all whom it may concern:*

Be it known that I, JAMES WELLS MOLIÈRE, of Cleveland, in the county of Cuyahoga and State of Ohio, (formerly of Detroit, Michigan,) have invented an Improvement in Thermo-Electric Baths, of which the following is a specification:

My improvement relates to therapeutic baths; and consists of a chamber adapted to one person, the bottom or floor of which is composed of copper plate, the sides are lined with zinc, and are in connection with the copper plate. The door is also lined with zinc, and in closing is brought into electrical connection with the bottom copper plate by a strip of copper at the bottom of the door. Resting upon the copper plate and in connection therewith is a series of metal plates or strips, of opposite electric character, upon which rests the metallic heaters or pipes, separated from the bottom copper and zinc side plates by the strips above named. Upon the heaters rests a series of copper and zinc strips, similar to those below, but not in contact with the side and bottom. The door is provided with a wet sponge, in contact with the zinc plate of the door, and the series of zinc and copper plates that lie upon the steam coil are brought into metallic connection with a foot-rest. Now, by introducing a current of caloric through the coil or heater, an electric condition of opposite properties is established between the bed and side plates, and the series of zinc and copper strips resting upon them, and the series of strips of zinc and copper resting upon the heater, and in contact with the foot-rest.

Now it occurs that, when the patient becomes seated upon the insulated stool with his feet upon the foot-rest, and a jet of steam or caloric caused to pass through the pipes, the electrical action induced has its circuit established through the body of the patient, by bringing the back in contact with the wet sponge, and the feet in contact with the foot-rest. The stronger or positive pole may be at the sponge end of the circuit, and the weaker at the foot-rest.

The object of this invention is to secure, by the combined application of silent electrical currents and alternating degrees of temperature, ranging from 55° to 85° or 90° Fanrenheit, and without a vapor bath, a free opening of the pores of the skin, and, consequently, a profuse perspiration, without the exhaustion usually accompanying a vapor or hot bath, and immediately following such period of perspiration, cleansing the skin by means of a douch-bath, alternating with water ranging from 90° to 60° through the same "rose-head."

By this arrangement no cooling of the head is required, as no congestion ensues, as in the ordinary vapor, air, or water baths.

The accompanying plate of drawings illustrates the present invention.

Figure 2:
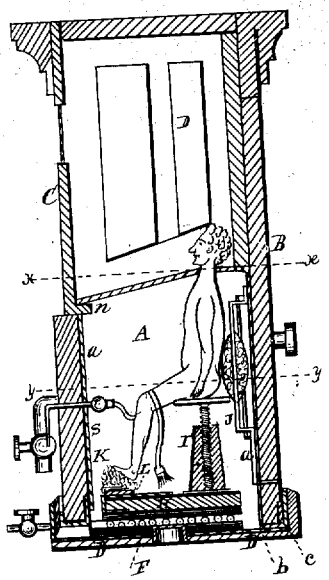
Figure 3:
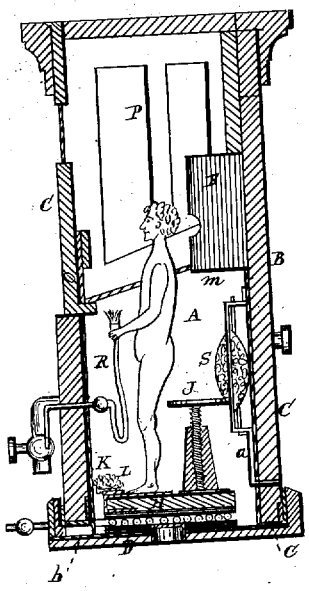
Figure 4:
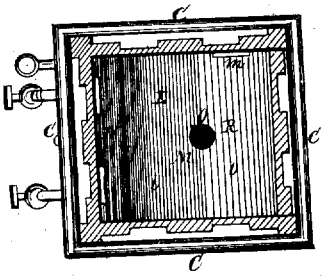
Figure 5:
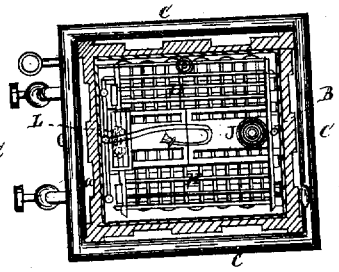
Figure 6:
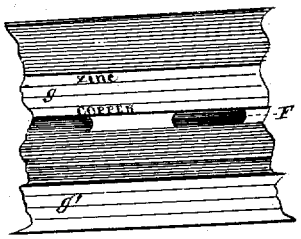
Figure 7:
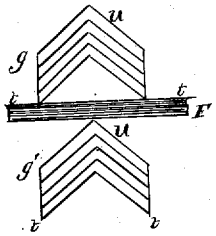

Figure 1 is a side elevation. Figs. 2 and 3 are similar vertical sections, from front to rear, of a bath-chamber constructed according thereto, showing, in the one, the bather seated and inclosed, and in the other, the bather released. Figs. 4 and 5 are horizontal sections, respectively, in planes of lines *x x* and *y y*, Fig. 2. Fig. 6 is a plan view; Fig. 7, a cross-section of the coil of pipe and the applied metallic plates.

In the drawings, A represents a chamber suitable to admit a person. This chamber A, in the present instance, is made of a square box form, and at one side has a door, B, for convenience of entrance, and on all its four sides the chamber is inclosed, as shown. The chamber is constructed of wood or other non-conducting material, and each of its several sides C are covered or sheathed interiorly with sheet-zinc, as shown at *a*, extending in each case from the floor D of the chamber up to the lid E, which is arranged above for closing about the neck of the bather, as will be hereinafter described. The floor D is covered or sheathed interiorly with sheet-copper, as shown at *b*, and this copper is in direct contact and connection with the lower edge *c* of the sheet-zinc of the several sides C.

F is a coil of metallic pipe. This pipe-coil is located upon the floor D of the chamber; and it is adapted, as ordinarily, for the passage of steam, hot air, or other vapor or heated medium, through it, a cock being located within or without the chamber for regulating the same. The coil F is overlaid and underlaid with similar angular metallic plates or strips *g* of opposite electric qualities—as, for instance, zinc and copper applied alternately one to the other, and with zinc as the lower plate of the underlay of plates, this lower plate being in contact with the copper-covered floor. The coil of pipe and its overlay of plates *g* is covered with a wooden slatted flooring H, which is, in fact, the floor of the bath-chamber on which the bather stands. This slatted floor H is provided with a stool, I, having its seat J, as in piano-stools, adjustable as to height; and on the stool I the bather is to sit. The floor H is also provided with a rest, K, for the feet of the bather, which foot-rest is in electric connection with the overlay-plates *g* of the pipe-coil by and through the metallic plate *h*, in the present instance copper, which is in contact with the upper zinc plate of the overlay-plates *g*. The foot-rest K has a sponge or electrode, L, for the direct contact of the feet; and this sponge, for special therapeutic purposes, is to be saturated with solutions of alkalies, acids or salts, or other chemicals.

The overlay and underlay of metallic plates *g* are for the purpose of increasing the magnetic and electric action or effect of the bath-chamber; and, as before stated, the plates are of zinc and copper, alternating with each other, commencing with copper in each instance at their contact with the coil of pipe, and ending with zinc. More or less of these "piles" may be used, according as more or less density or force of electric action may be required; and in lieu of zinc and copper other well-known equivalents for each may be substituted. (Either water or steam, or both, may be passed through the pipes. The heat or frictional action of the fluid induces silent currents of electricity, the circuit being established through the sponge L and foot-rest K and the body of the bather.) The closing-lid E is made in three sections, M, N, and O. Two, M and N, of these sections are hinged together at *l*, and the section N is hinged to the rear side of the chamber, so as to swing upwardly. The section O is hinged at *m* to one side of the chamber. When these several sections are down, they are supported in position by the shoulder or rib *n* of the chamber, and they close the top of the chamber, all as shown in Fig. 1, but allow the head of the bather to project above the lid; and for such purpose the contact-edges *o* of the two sections M and O are cut out semicircularly, as at *p*, sufficiently to surround the bather's neck. Above the lid E the three fixed sides of the chamber are provided with panels P, arranged, as shown in Fig. 3, to be raised or lowered from the inside or outside of the chamber for ventilation during the bathing operation.

The bather, upon entering the bath-chamber, closes the door, raises the side panels P, and takes a seat upon the stool I, with his back toward the door, as shown in Fig. 1. He then lowers the lid-section O to its horizontal position, and this section fits, by its semicircular cut *p*, about the back of the bather's neck, and after this he lowers the other lid-sections M and N, one, M, of which similarly fits the front of the bather's neck, and thus while the head is exposed the body of the bather is inclosed within the bath-chamber A. The seat of stool I having been adjusted as to height, to suit the position of the bather, above stated, and with the feet of the bather upon the foot-rest K, the bather then opens the coil of pipe to the admission of the heated medium, and the operation of the bath commences. The heat from the pipe-coil causes the metallic lining of the bath to become surcharged with thermo electricity, and, when the bather has become sufficiently charged thereby, the coil of pipe is closed to the further admission of the heated medium.

The bather having remained a sufficient time under the influence of the thermo-electricity, he opens the lid-sections M N O, and lowers the side panels P, and then uses the hose-sprinkler R, adapted at *s*, as ordinarily, for both hot and cold water, to secure the desired temperature.

The plates *g* may be flat; but it is preferable to make them angular, as then the heat is received simultaneously at the edges *t* and angles *u* of each plate, and thus is the more perfectly and evenly conducted through the metal, and a better electric action obtained. Besides, the water, from the use of the sprinkler, is the better shed and conducted off from them to the bottom of the chamber A.

The lid E, herein described, obviously is susceptible of ready manipulation by the bather himself—a most important advantage.

For a concentrated application of the electric action, I have located upon the inside of the door B a sponge-cushion or pad, S, which is in electric connection with the zinc sheathing of the door and the copper covering of the bottom, and is adapted, as shown, to be slid up and down, so that it may be brought, as to height, to the place desired against the back of the person. This sponge or electrode, for special therapeutic purposes, may be charged with alkalies, acids, or salts, as was stated, for the sponge of the foot-rest. The pad may be made of other materials, but sponge is preferable.

In lieu of a coil of pipe for conducting heat to the electric piles *g*, and to the inside of the chamber A, the heat may be given to the piles and to the chamber by the interposition of any suitable plate metal—as, for instance, plate-copper, plate-zinc, or plate-iron—to receive the heat from the heating device, which may be, for instance, a gas or other flame, located to impinge against said interposed sheet, and thus heating the same, conduct it (the heat) to the electric plates on the inside of the chamber.

What I claim as my invention, and desire to secure by Letters Patent, is—

1. The combination of the metallic-lined chamber A, having a lid composed of the sections M N O, slide P, coiled pipe F, and electric pile-plates *g*, substantially as herein shown and described.

2. The system of heating-pipes F, in combination with the series of plates of opposite electric character, substantially as and for the purpose set forth.

3. The heaters or pipes F, interposed between the series of negative and positive electro-plates *g*, in combination with the slatted or open floor H and the chamber A, substantially as and for the purpose set forth.

4. The system of heating-pipes F and positive and negative plates *g g'*, in combination with the copper-bottom and zinc-plate lining of the chamber A, the same being brought into electric relations with the plates *g g'*, by means of the heaters F, substantially as specified.

5. The adjustable or stationary sponge-cushion or pad S, in combination with the zinc and copper lining of the door, and the positive and negative plates *g g'*, substantially as and for the purpose specified.

6. The sponge cushion or pad S, in combination with the foot-rest K and positive and negative plates *g g'*, substantially as and for the purpose set forth.

JAMES W. MOLIÈRE, M. D.

Witnesses:
J. H. BURRIDGE,
E. W. CROSS.